(12) United States Patent
Shimizu et al.

(10) Patent No.: US 6,484,753 B1
(45) Date of Patent: Nov. 26, 2002

(54) SINGLE LEVER MIXING VALVE

(75) Inventors: Takahiro Shimizu, Mie (JP); Satoru Fukuzawa, Mie (JP); Takumi Hayashi, Mie (JP); Shinji Kosaki, Mie (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 09/716,684

(22) Filed: Nov. 20, 2000

(30) Foreign Application Priority Data

Nov. 25, 1999 (JP) .............................. 11-333591
Feb. 14, 2000 (JP) ......................... 2000-035331

(51) Int. Cl.$^7$ ........................................... F16K 11/078
(52) U.S. Cl. .................. 137/625.17; 251/291
(58) Field of Search .................. 251/291, 292; 137/625.17, 625.4

(56) References Cited

U.S. PATENT DOCUMENTS

| | | | |
|---|---|---|---|
| 1,286,238 A | * 12/1918 | Copeland .................. 251/191 |
| 3,250,148 A | * 5/1966 | Soles .......................... 251/291 |
| 4,445,529 A | * 5/1984 | Lagarelli ..................... 137/360 |
| 4,708,318 A | * 11/1987 | Simo | |
| 5,337,450 A | * 8/1994 | Martin ...................... 16/114 R |
| 5,850,846 A | * 12/1998 | Hannemann et al. ....... 137/315 |
| 5,921,527 A | * 7/1999 | Ikawa et al. ............ 251/129.03 |

* cited by examiner

*Primary Examiner*—John Fox
(74) *Attorney, Agent, or Firm*—Hedman & Costigan, P.C.

(57) ABSTRACT

In a single lever mixing valve, having a sliding member sliding on a lever holder, for adjusting an amount and temperature of discharge water by rotating a disk actuating stem on an axis thereof or by operating a handle lever for inclining the disk actuating stem.

A fit-in hole is so formed on the handle lever that the disk actuating stem is loosely fitted therein, with a gap formed between a side surfaced of the disk actuating stem and a gap-defining inner surface of the handle lever; a spacer so sized as to close the gap is provided; a spacer insertion hole is formed in the handle lever such that the spacer insertion hole is open on an outer surface of the handle lever; and the spacer is inserted into the spacer insertion hole to fix the disk actuating stem fitted in the spacer insertion hole.

4 Claims, 9 Drawing Sheets

SINGLE LEVER MIXING VALVE

BACKGROUND OF THE INVENTION

The present invention relates to a single lever mixing valve and more particularly to a single lever mixing valve having an improved operability.

The Single lever mixing valve is used a lot in a kitchen, a washing stand, and the like owing to its convenience.

The Single lever mixing valve is described below with reference to FIG. 13 showing a cartridge of the Single lever mixing valve.

A handle lever 8 is directly connected to a disk actuating stem 2 to transmit the motion of the handle lever 8 to a movable disk 4.

Cold and hot water enter the Single lever mixing valve from inlets port 6, pass through holes of a fixed disk 5, and are discharged from a outlet port 7 through a path shown with an arrow E.

A lever holder 1 is assembled inside the cartridge. The disk actuating stem 2 transmits a linear motion of the handle lever 8 for adjusting the amount of discharge water and a rotary motion of the handle lever 8 for adjusting the temperature of the discharge water to the movable valve 4. In correspondence to the linear motion and the rotary motion of the handle lever 8, the lever holder 1 slides on a sliding portion between it and the disk actuating stem 2, between it and the movable valve 4, and between it and a housing 3. The sliding portion is important because it affects the operability of the handle lever 8. In the conventional Single lever mixing valve, it is essential to apply a lubricant such as silicone grease to the sliding portion to allow smooth sliding of the handle lever 8 and the other members.

However, in recent years, people are more and more conscious of environmental hygiene. Thus, more and more users are unwilling to use the silicone grease although it is not harmful for the human body.

In the case where the single lever mixing valve is used in a particular environment, for example, a restaurant or the like and in case where it is used at high frequencies, the lubricant may decrease. With the decrease of the lubricant, an operator feels that the handle lever becomes heavy with time in its operation, squeaking sounds are generated during the operation thereof, and the operability thereof will deteriorate.

To apply the lubricant such as the grease to the sliding surface, it is necessary to produce the process of preparing the lubricant, applying the grease to the sliding portion, and maintaining grease-applying device. Consequently, the production efficiency will deteriorate.

The relationship between the handle lever 8 and the disk actuating stem 2 is described below with reference to FIG. 14. The handle lever 8 of the conventional single lever mixing valve is rotated on the disk actuating stem 2 square pillar-shaped or the like to rotate the movable valve 4 accommodated in the housing 3 to thereby adjust the amount of the discharge water, and the angle of the handle lever 8 with respect to a horizontal line is changed to incline the axis of the disk actuating stem 2 to thereby adjust the amount of discharge water by means of the movable valve.

The disk actuating stem 2 is fixed to the fit-in hole 8a formed in the vicinity of an end of the handle lever 8 opposite to the gripping portion thereof with a screw 8b, with the disk actuating stem 2 fitted in the fit-in hole 8a. A blindfolding plate-shaped cap 8c made of synthetic resin is installed on the screw 8b.

As shown in FIGS. 15 and 16, according to one mode of screwing the disk actuating stem 2 and the handle lever 8 to each other, a screw hole 2b is formed axially in the disk actuating stem 2 from an end surface thereof, and the screw 8b is inserted into a through-hole 8d formed in the vicinity of one end of the handle lever 8. According to another mode of screwing the disk actuating stem 2 and the handle lever 8 to each other, as shown in FIG. 16, the screw 8b is screwed into the screw hole 2b formed horizontally from one end surface of the handle lever 8, and the front end of the screw 8b is pressed against the disk actuating stem 2 to fix the disk actuating stem to the handle lever 8.

However, in any of the above-described conventional single lever mixing valves, the handle lever and the disk actuating stem are fixed to each other with a screw to which a loosening prevention agent (commercial name: Locktight) applied to increase the friction resistance of the surface of the screw. Thus, a handle lever-installing operation takes time and labor.

Further, in the handle lever-installing operation, screw-tightening degrees are apt to be nonuniform. Thus, produced single lever mixing valves are liable to have nonuniform tolerances.

Further, during the use of the single lever mixing valve, there is a possibility that the loosening prevention agent penetrates into a sliding portion between mixing valves of the single lever mixing valve little by little. If the loosening prevention agent remains on the sliding portion, the sliding portion is worn. Consequently, a liquid such as water passing through single lever mixing valve is easy to leak.

Furthermore, the action of the loosening prevention agent of preventing loosening of the screw deteriorates gradually with time. Thus, the long-time use of the single lever mixing valve causes the screw to be loose and makes it difficult to operate the handle lever securely.

Consequently, an operator feels that the handle lever becomes heavy with time in its operation, squeaking sounds are generated during the operation thereof, and the operability thereof will deteriorate.

SUMMARY OF THE INVENTION

The present invention has been made to overcome the above-described problems. Accordingly, it is an object of the present invention to provide a single lever mixing valve eliminating application of a lubricant to sliding portion in consideration of environmental hygiene, allowing an operator to feel that the handle lever is lightweight in its operation even though the lubricant is not applied to the sliding portion, preventing a torque from fluctuating with time, and allowing the handle lever to be operated easily.

It is another object of the present invention to provide a single lever mixing valve having a simple handle lever-fixing construction eliminating the need for application of a loosening prevention agent. It is still another object of the present invention to provide a single lever mixing valve allowing the handle lever to be operated lightly and securely even though the single lever mixing valve is used for a long time.

More specifically, in the single lever mixing valve, a handle lever-installing operation can be accomplished in a possible simplest degree and assembled without taking much time and labor. It is still another object of the present invention to provide a single lever mixing valve which allows the handle lever to be Installed securely, has a uniform tolerance, prevents the handle lever from being loose or causing no troubles even though the single lever mixing valve is used over as many as 200,000 cycles, and prevents a movable disk and a fixed disk from being damaged easily.

To achieve the object, there is provided a single lever mixing valve comprising a sliding member sliding on a lever holder, and a disk actuating stem supported with the lever holder, for adjusting an amount and temperature of discharge water by inclining or rotating on an axis thereof the disk actuating stem to be operated by a handle lever. One sliding surface of at least one of the sliding portions in which the lever holder and the sliding member slide on each other is formed of a polyamide resinous composition.

The polyamide resinous composition contains polyolefin resin essentially or is aromatic polyamide resin. The aromatic polyamide resin in the present invention has aromatic rings in its chemical structure of polymeric main chain.

One sliding surface or both sliding surfaces of at least one of the sliding portions are formed of the polyamide resinous composition. Thus, the sliding surface has favorable sliding performance, Consequently, the torque of the handle lever hardly fluctuates with time during the operation of the handle lever even though the lubricant is not applied to the sliding portions. Thus, it is possible to provide the greaseless single lever mixing valve.

According to another aspect of the present invention, there is provided a single lever mixing valve for adjusting an amount and temperature of discharge water by rotating a disk actuating stem, on an axis thereof or by operating a handle lever for inclining the axis of the disk actuating stem. A fit-in hole is so formed on the handle lever that the disk actuating stem is loosely fitted therein, with a gap formed between a side surface of the disk actuating stem and a gap-defining inner surface of the handle lever. A spacer so sized as to close the gap is provided. A spacer insertion hole is formed in the handle lever such that the spacer insertion hole is open on an outer surface of the handle lever. The spacer is inserted into the spacer insertion hole to fix the disk actuating stem fitted in the spacer insertion hole.

In the single lever mixing valve, it is possible to adopt the construction in which the spacer insertion hole is formed in penetration through the handle lever in the range from the gap to the outer surface of the handle lever.

In the single lever mixing valve, it is possible to adopt the construction in which the spacer insertion hole is wedge-shaped such that the insertion hole becomes gradually smaller toward an inner end along the gap.

In the single lever mixing valve having the above described construction, the disk actuating stem is loosely fitted in the fit-in hole of the handle lever made of resin, with a gap formed between the side surface of the disk actuating stem and the gap-defining inner surface of the handle lever. Therefore, it is simple and speedy to fit the disk actuating stem in the handle lever. There is no gap left by merely inserting the spacer into the spacer insertion hole on the outer surface of the handle lever. Thus, the disk actuating system can be fixed to the fit-in hole, with both in close contact with each other. This construction eliminates the need for the provision of a screwing construction and for the application of a loosening prevention agent.

Further, a certain fixing force can be obtained owing to the frictional engagement between the fit-in hole and the disk actuating stem. Thus, the single lever mixing valve has a uniform tolerance.

In the above-described construction in which the spacer insertion hole is formed in penetration through the handle lever in the range from the gap to the outer surface of the handle lever, the spacer is pressed against the side surface of the disk actuating stem and allows the disk actuating stem and the handle lever to closely contact each other.

In the above-described construction in which the spacer insertion hole is wedge-shaped such that the insertion hole becomes gradually smaller toward the inner end along the gap, the spacer inserted into the spacer insertion hole expands the narrow portion of the inside of the spacer insertion hole. Consequently, the fit-in hole formed in the handle lever so deforms that the gap decreases. When the fit-in hole has made a deformation to the maximum, the side surface of the fit-in hole and that of the disk actuating stem are pressed against each other.

It is preferable to adopt the construction in which a concave portion or a convex portion which fits in the concave portion is formed on a side surface of the fit-in hole or the disk actuating stem to prevent the disk actuating stem from sliding axially. This construction fixes the handle lever and the disk actuating stem to each other securely.

In the single lever mixing valve having such a construction, the fit-in hole and the disk actuating system are so locked to each other with the convex portion and the concave portion that the disk actuating stem is incapable of moving axially. Thus, the slip-off of the handle lever is securely prevented.

In the single lever mixing valve having any one of the above described constructions, a linear projection is formed on a side surface of the spacer or a side surface of the spacer insertion hole along a spacer insertion direction.

In the construction, when the spacer is inserted into the spacer insertion hole, both members contact each other through the linear projection. That is, both members contact each other not entirely. Thus, both members contact each other in a smaller area when and after the spacer is inserted into the spacer insertion hole. Therefore, the friction resistance is low, which allows a smooth operation of inserting the spacer into the spacer insertion hole and removing it therefrom to replace component parts.

DETAILED DESCRIPTION OF THE PREFERRED EMBODIMENTS

Figure 1:
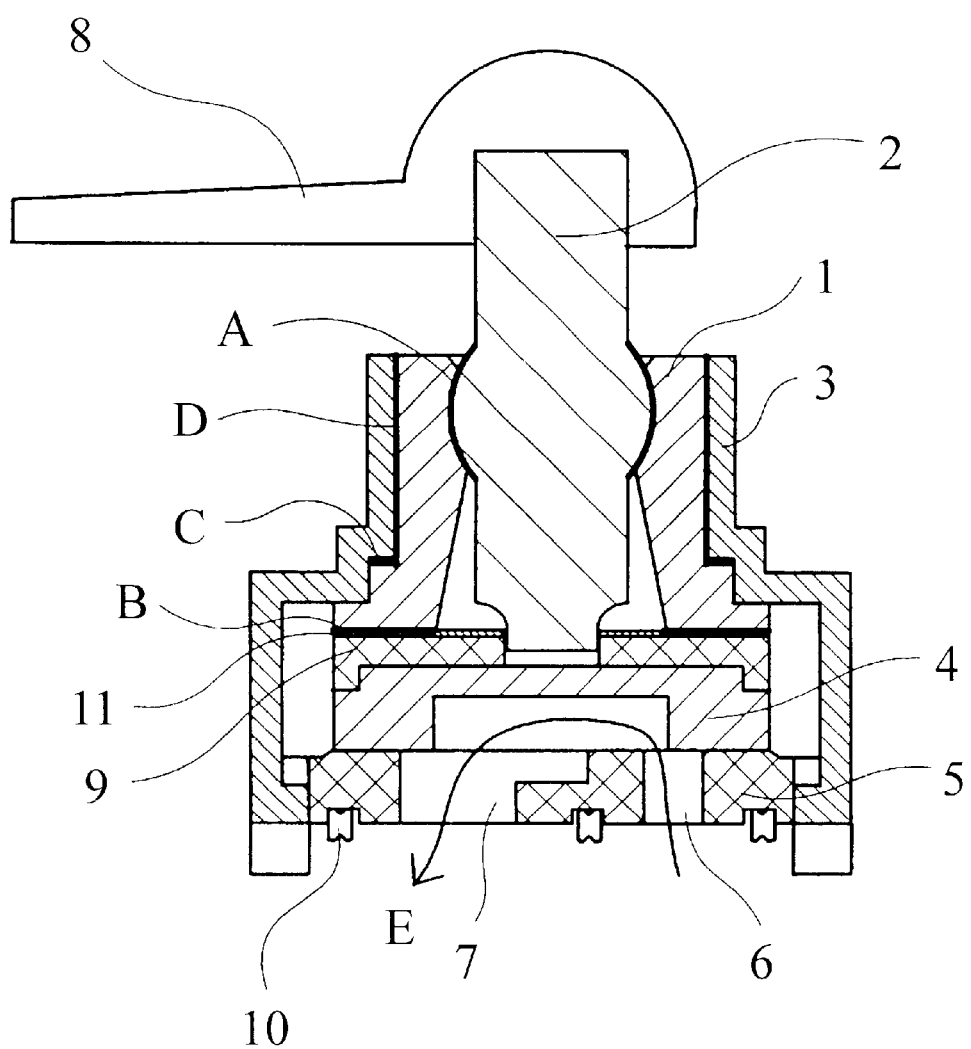
FIG. 1 is a sectional view showing the construction of a cartridge of a single lever mixing valve.
Figure 2:
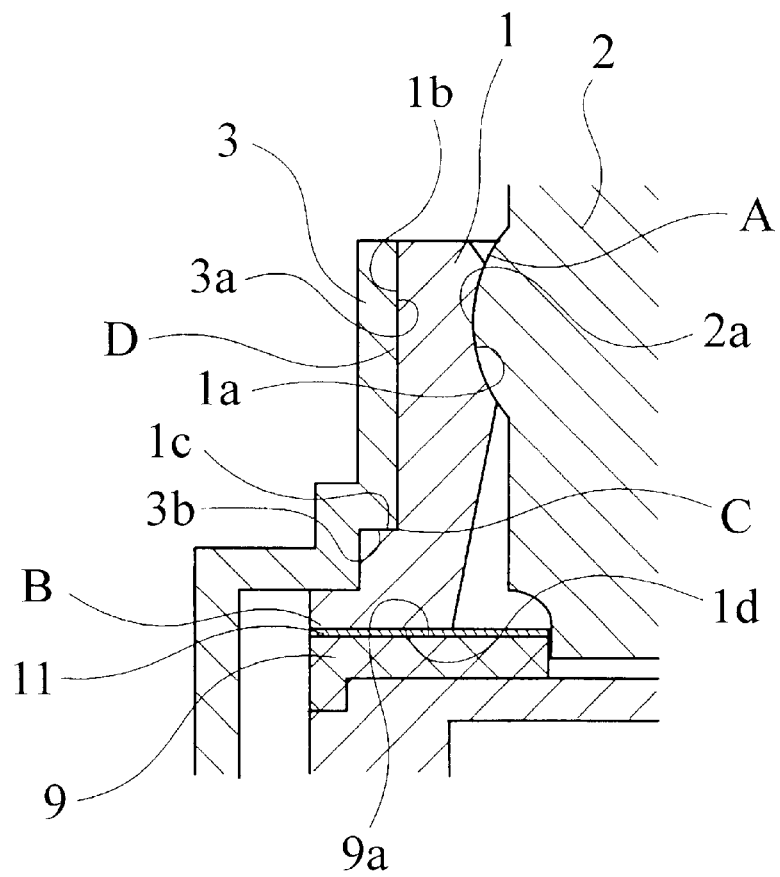
FIG. 2 is a partly enlarged sectional view showing a sliding portion.

FIGS. 1 and 2 show an example of the single lever mixing valve of the present invention. FIG. 1 is a sectional view showing the construction of the three-hole single lever mixing valve having seven component parts. FIG. 2 is a partly enlarged sectional view showing a sliding portion.

The handle lever 8 is directly connected to a disk actuating stem 2 to transmit the motion of the handle lever 8 to a movable disk 4 installed inside a housing 3. Cold and hot water pass through ports of a fixed disk 5. That is, the cold water and the hot water entered from inlet ports 6 are mixed with each other in a mixing cavity of the movable disk 4. The mixture of cold and hot water is discharged to the outside through a path shown with an arrow E, namely, through an outlet port 7 and a faucet (not shown). The single lever mixing valve has a movable disk-pressing member 9 is interposed between the movable disk 4 and the lever holder 1 to transmit the motion of the disk actuating stem 2 to the movable disk 4.

The lever holder 1 is accommodated in the housing 3 to support a linear motion (for adjustment of amount of discharge water) of the handle lever 8 and a rotary motion (for adjustment of temperature of discharge water) thereof. The lever holder 1 adjusts to a forward and rearward movement of the movable disk 4 when the handle lever 8 makes the linear motion, and rotates together with the disk actuating stem 2 when the handle lever 8 makes the rotary motion, thus adjusting to the rotary motion of the movable disk 4. There are a sliding portion A between the lever holder 1 and the disk actuating stem 2, a sliding portion B between the lever holder 1 and the movable disk-pressing member 9, and sliding portions C and D between the lever holder 1 and the housing 3 to allow these members to slide on each other at the respective sliding portions. More specifically, the lever holder 1 has a sliding surface 1a that slides on a sliding surface 2a of the disk actuating stem 2, sliding surfaces 1b and 1c that slide on sliding surfaces 3a and 3b of the housing 3, respectively, and a sliding surface 1d that slides on a sliding surface 9a of the movable disk-pressing member 9.

According to the present invention, one sliding surface or both sliding surfaces of at least one of the sliding portions are formed of a polyamide resinous composition containing at least polyamide resin and polyolefin resin or aromatic polyamide resin. The sliding surface of the lever holder 1 forms one of the sliding surfaces of each of the sliding portions A, B, C, and D. Therefore, according to the present invention, preferably, the lever holder 1 is formed of the polyamide resinous composition containing the polyamide resin or formed of the aromatic polyamide resin.

The lever holder 1 may be formed of synthetic resin such as acrylonitrile butadiene styrene resin (hereinafter abbreviated as ABS). It is possible to bond a sheet formed of the polyamide resinous composition containing the polyamide resin as its main component and the polyolefin resin or formed of the aromatic polyamide resin to each sliding a surface of the lever holder 1 formed of the ABS.

According to the present invention, it is preferable to install a washer in each sliding portion so that the sliding surfaces thereof slide on each other through the washer. The washer improves the durability of the sliding surface. Preferably, the washer 11 is Installed in the sliding portion between the lever holder 1 and the movable disk 4 or between the lever holder 1 and the movable disk-pressing member 9, because a high load is applied to these sliding portions. As the material of the washer, metal or resin is used. The washer can be a filmlike material having a thickness not more than 0.5 mm or a platelike material having a thickness more than 0.5 mm. In view of its productivity, obtainability, manufacturing cost, and the like, preferably, the washer is made of metal.

According to the present invention, the sliding surface of at least one of the movable disk 4 and the fixed disk 5 is formed of a self-lubricating material to eliminate the application of a lubricant such as silicone grease to the sliding portion.

The self-lubricating material means a film of diamond-like carbon, synthetic resin containing a solid lubricant which reduces its friction coefficient or a film of carbon. It is unnecessary to apply the lubricant to the single lever mixing valve having these valves and the lever holder 1 combined with one another.

The polyamide resin that can be used in the present invention has a glass transition temperature (Tg) not less than 55° C. and favorably not less than 70° C. The polyamide resin having the glass transition temperature (Tg) less than 55° C. can deform depending on a use mode. It is preferable to use the polyamide resin that can be injection-molded.

The polyamide resin that can be used in the present invention includes aliphatic polyamide resin such as polyamide 6-6 resin, polyamide 6-9 resin, polyamide 6-10 resin, polyamide 6-12 resin, polyamide 4-6 resin, polyamide 6 resin, and polyamide 12 resin, polyamide 11 resin; and the aromatic polyamide resin such as polyamide 6-T resin indicated by a formula (II) shown below, polyamide MXD-6 resin indicated by a formula (I) shown below, polyamide 6-IT resin, polyamide 6-6T resin, polyamide 6-6IT resin, polyamide 6D-T resin, polyamide 6/6T resin, and polyamide 9-T resin. These polyamide resins can be used singly or as a mixture.

The numerical values attached to the polyamide resins respectively indicate the number of carbon atoms in the amide bond. D of 6D-T indicates methylpentanediamine residue. T of 6D-T indicates terephthalic acid residue. and I of 6IT indicates isophthalic acid residue.

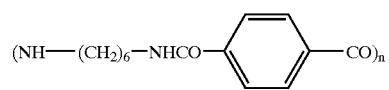

(II)

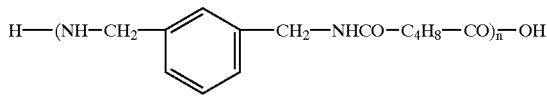

$$H-(NH-CH_2-\phantom{XX}-CH_2-NHCO-C_4H_8-CO)_{\overline{n}}-OH \qquad (I)$$

According to the present invention, the aromatic polyamide resin is more favorable than the aliphatic polyamide resin. The aromatic polyamide resin has aromatic rings in the molecular main chain and a much lower water absorption coefficient than the aliphatic polyamide resin. Thus, the aromatic polyamide resin can be used singly. The aromatic polyamide resins indicated by the formulas (I) and (II) are more favorable because they have excellent property in resistance to water and excellent sliding property.

It is possible to use the aliphatic polyamide resin, of which water absorption coefficient is reduced by polymer-alloying it with the polyolefin resin.

The polyolefin resin having a unit indicated with a formula (III) shown below is preferable because it is compatible with the polyamide resin and the material cost thereof is inexpensive.

$$-CH_2CHX- \qquad (III)$$

where X indicates at least one of H, $CH_3$, Cl, OH, and aromatic ring.

Of the polyolefin resin, the following polyethylenes containing H as the X are preferable: low-density polyethylene, straight-chain low-density polyethylene, intermediate-density polyethylene, high-density polyethylene, and ultra-high-molecular-weight polyethylene. Polypropylene containing $CH_3$ as the X is also preferable. These substances can be used singly, as a mixture, a copolymer or a modified substance.

The polyethylenes are favorable polyolefin resin because of good compatible with the polyamide. It is possible to use modified polyethylene obtained by graft-polymerizing graft monomers such as α,β-unsaturated carboxylic acid or its derivatives. The α,β-unsaturated carboxylic acid includes acrylic acid, methacrylic acid, maleicacid, fumaricacid, tetrahydrophthalicacid, itaconic acid, citraconic acid, crotonic acid, and endocis-bycyclo[2,2,1]hepto-5-en-2,3-dicarboxylic acid. The maleic acid and the endocis-bycyclo[2,2,1]hepto-5-en-2,3-dicarboxylic acid are more favorable than the other α,β-unsaturated carboxylic acids.

The polyamide resin is superior in lubricity and compatibility with the polyolefin resin. The lubricity of the polyamide resin is improved by polymer-alloying it with the polyolefin resin.

In polymer-alloying the polyamide resin with the polyolefin resin, it is favorable to mix 5–100 parts by weight of the polyolefin resin with 100 parts by weight of the polyamide resin. If the mixing ratio of the polyolefin resin is less than five parts by weight or more than 100 parts by weight for 100 parts by weight of the polyamide resin, resulting polymer-alloyed polyamide resin is inferior in its lubricity. To improve the lubricity of the polymer-alloyed polyamide resin to a higher extent, it is more favorable to mix 10–50 parts by weight of the polyolefin resin with 100 parts by weight of the polyamide resin.

To reduce the water absorption coefficient of the aliphatic polyolefin resin, it is preferable to mix 20–100 parts by weight of the polyolefin resin with 100 parts by weight of the polyamide resin.

EXAMPLE 1

The outer diameter of a cylindrical lever holder of the single lever mixing valve of example 1 was so adjusted that an outer sliding surface thereof slides on the inner peripheral surface of a housing of the single lever mixing valve. The inner diameter of the level holder was so adjusted that an inner sliding surface thereof slides on a sliding surface of a disk actuating stem of the single lever mixing valve. The lever holder was formed by injection molding by using a resinous composition containing 100 parts by weight of polypropylene resin for 100 parts by weight of polyamide 4-6 resin.

A cartridge of the single lever mixing valve as shown in FIG. 1 was assembled by using the prepared lever holder. Grease was not applied to the sliding surface of the lever holder.

EXAMPLE 2

A lever holder having the same configuration as that of the lever holder of the example 1 was formed by injection molding by using a resinous composition containing 20 parts by weight of polyethylene resin for 100 parts by weight of the polyamide 6-T resin shown by the formula (II). A cartridge having the same configuration and construction as those of the example 1 was assembled by using the lever holder.

EXAMPLE 3

A lever holder having the same configuration as that of the lever holder of the example 1 was prepared by using ABS resin. A sheet having a thickness of 0.6 mm was prepared by using a resinous composition containing 20 parts by weight of the polyethylene resin for 100 parts by weight of the polyamide 6-T resin shown by the formula (II). The sheet was bonded to the sliding surface composing the sliding portion B, shown in FIG. 2, between the lever holder and the movable disk-pressing member. A cartridge having the same configuration and construction as those of the cartridge of the example 1 was assembled by using the lever holder.

EXAMPLE 4

A lever holder having the same configuration as that of the lever holder of the example 1 was formed by injection molding by using a resinous composition containing 5 parts by weight of the polyethylene resin for 100 parts by weight of the polyamide MXD-6 resin shown by the formula (I). A cartridge having the same configuration and construction as those of the example 1 was assembled by using the lever holder. However, in the example 4, a washer made of SUS303 was mounted on the sliding portion B, shown in FIG. 1, between the lever holder and the movable disk-pressing member.

EXAMPLE 5

A lever holder having the same configuration as that of the lever holder of the example 1 was formed by injection molding by using the polyamide MXD-6 resin shown by the formula (I). A cartridge having the same configuration and construction as those of the example 1 was assembled by using the lever holder.

EXAMPLE 6

A lever holder having the same configuration as that of the lever holder of the example 1 was prepared by using the ABS resin. A sheet having a thickness of 0.6 mm was prepared by using the polyamide MXD-6 resin shown by the formula (I). The sheet was bonded to the sliding surface composing the sliding portion B, shown in FIG. 2, between the lever holder and the movable disk-pressing member. A cartridge having the same configuration and construction as those of the cartridge of the example 1 was assembled by using the lever holder.

EXAMPLE 7

A lever holder having the same configuration as that of the lever holder of the example 1 was formed by injection molding by using the polyamide 6-T resin shown by the formula (II). A cartridge having the same configuration and construction as those of the cartridge of the example 1 was assembled by using the lever holder. However, a washer made of SUS303 was attached to the sliding surface composing the sliding portion B, shown in FIG. 2, between the lever holder and the movable disk-pressing member.

Comparison Example 1

A lever holder having the same configuration as that of the lever holder of the example 1 was formed by injection molding by using polyacetal resin impregnated with 7 wt % of poly-α-olefin. A cartridge having the same configuration and construction as those of the example 1 was assembled by using the lever holder. Grease was not applied to sliding surfaces of the lever holder.

Single lever mixing valves were assembled by using the respective cartridges prepared in examples 1–7 and comparison example 1 to conduct durability tests by operating the respective single lever mixing valves.

Initially, the handle lever torque was measured to evaluate an initial operability of each single lever mixing valve before the durability test was conducted.

A torque of the handle lever in a vertical direction (for water discharge, stop of water flow, and adjustment of flow rate) and a torque thereof in a horizontal direction (for adjustment of temperature of water) were measured by using a torque measuring device. When measured values of handle lever torques were in the range of 14–70N·cm, they were determined as favorable. When measured values of handle lever torques are lower than 14N·cm, there is a possibility that the handle lever drops by its own weight during use. When measured values of handle lever torques are more than 70N·cm, there is a possibility that smooth operability cannot be obtained. The more favorable range of the handle lever torque is 21–56 N·cm.

Figure 3:
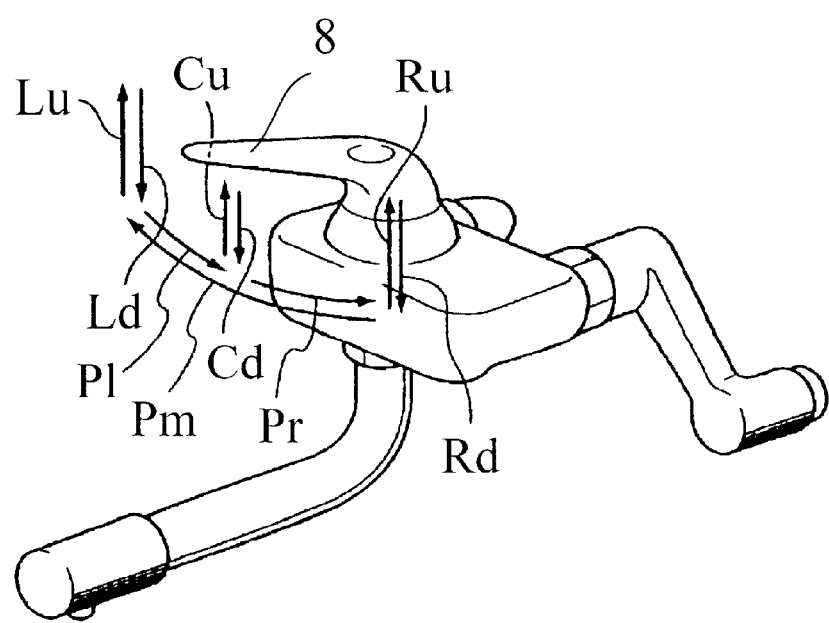
FIG. 3 shows a durability test device and a test cycle.

The operability of each single lever mixing valve was evaluated by measuring the handle lever torque at the initial stage of the durability test and during and after the durability test. FIG. 3 shows a durability test apparatus (manufactured by NTN Engineering Plastics Co., Ltd).

The durability test was conducted by using valves used in the initial test in a cycle shown in FIG. 3, with the handle lever connected to the durability test apparatus. That is, the handle lever 8 was moved from the upper right end at which at which flow of water was stopped to the lower left end at which the water was discharged (shown with arrow Rd)→the handle lever 8 was rotated from the lower right end to the lower left end at which flow of the hot water of 80° C. was stopped (shown with arrow Lu)→the handle lever was moved from the upper left end (shown with arrow Ld)→the handle lever 8 was rotated from the lower left end to the lower center at which hot water of 45° C. was discharged (shown with arrow Pl)→the handle lever 8 was moved from the lower center to the upper center at which flow of the hot water of 45° C. was stopped (shown with arrow Cu)→the handle lever 8 was moved from the upper center to the lower center (shown with arrow Cd)→the handle lever was rotated from the lower center to the lower right end (shown with arrow Pr)→the handle lever 8 was moved from the lower right end to the upper right end (shown with arrow Ru). The sequential operation of the handle lever was set to one cycle (it took 25 seconds). The handle lever torque of each single lever mixing valve was measured after every cycle shown in Table 1 and 200,000 cycles. Table 1 shows the results. Each handle lever torque shown in Table 1 is the average of the vertical and horizontal torques of each handle lever 8.

TABLE 1

| | Handle lever torque after cycles (x10000) | | | | | | | | |
|---|---|---|---|---|---|---|---|---|---|
| | 0 | 1 | 2 | 3 | 4 | 5 | 10 | 15 | 20 |
| Example | | | | | | | | | |
| 1 | 22.2 | 27.6 | 30.0 | 32.5 | 36.8 | 42.1 | 48.9 | 51.5 | 58.0 |
| 2 | 24.1 | 27.5 | 30.5 | 34.0 | 38.0 | 41.5 | 46.4 | 49.4 | 51.1 |
| 3 | 21.9 | 27.1 | 30.6 | 33.8 | 37.4 | 41.5 | 45.1 | 48.8 | 52.7 |
| 4 | 23.7 | 25.1 | 28.6 | 31.7 | 35.4 | 39.4 | 41.9 | 45.6 | 48.0 |
| 5 | 23.1 | 35.7 | 40.4 | 48.3 | 50.4 | 51.1 | 51.8 | 52.5 | 53.9 |
| 6 | 19.6 | 31.5 | 42.0 | 45.5 | 49.7 | 51.8 | 52.5 | 53.9 | 56.7 |
| 7 | 25.0 | 29.1 | 31.5 | 34.1 | 36.1 | 39.5 | 41.5 | 42.2 | 46.3 |
| Comparison Example | | | | | | | | | |
| 1 | 21.7 | 32.9 | 62.3 | 109.9 | — | — | — | — | — |

As shown in Table 1, in the single lever mixing valve of each example, the handle lever torques fluctuated in a small amount during the durability test and after 200,000 cycles, and no abnormal wear was recognized.

In the single lever mixing valve of examples 4 and 7 in which the metal washer was installed on the sliding surface composing the sliding portion B, the increase of the handle lever torque was lower than that of the other examples and the comparison example 1. In the comparison example 1, the operability of the handle lever deteriorated at 30,000 cycles. In the comparison example 1, leakage of water was found owing to a great reduction of the interference of the cartridge caused by abnormal wear of the sliding portion.

According to the present invention, one sliding surface of at least one of sliding portions in which the lever holder and the sliding member slide on each other is formed of a polyamide resinous composition containing polyamide resin as its main component and polyolefin resin or formed of aromatic polyamide resin. Therefore, the single lever mixing valve can withstand long term use even though grease is not applied to the lever holder.

Because the sliding surface of at least one of the movable disk and the fixed disk is formed of the self-lubricating material, it is possible to provide the greaseless single lever mixing valve and hence the sanitary single lever mixing valve.

The polyamide resinous composition contains 5–100 parts by weight of the polyolefin resin for 100 parts by weight of the polyamide resin. The polyamide resin is the aromatic polyamide resin expressed by the formula (I) or (II). Therefore, the single lever mixing valve of the present invention is high in resistance to water and sliding performance.

The washer is installed in at least one of the sliding portions, for example, the sliding portion between the lever holder and the movable disk or between the lever holder and the movable disk-pressing member. Thus, the operation torque of the handle lever does not increase. Consequently, the single lever mixing valve of the present invention is excellent in its operability.

The sliding surface of each of the movable disk and other members which slide on the sliding surface of the lever holder is formed on the side of the lever holder. Therefore, all the sliding portions of the single lever mixing valve have excellent sliding performance.

By injection molding, the entire lever holder is formed of the polyamide resinous composition containing the polyamide resin as its main component and the polyolefin resin or it is formed of the aromatic polyamide resin. Otherwise, it is possible to bond a sheet formed of the polyamide resinous composition containing the polyamide resin as its main component and the polyolefin resin or formed of the aromatic polyamide resin to the sliding surface of the lever holder formed of other synthetic resin. Thus, the single lever mixing valve is high in resistance to water, sliding performance and operability.

The construction of fixing the handle lever and the disk actuating stem to each other is described below with reference to Figures.

As shown in FIGS. 4 through 9, in the single lever mixing valve of embodiment 1 regarding to the fixing construction, it is possible to rotate the approximately square pole-shaped disk actuating stem 2 made of metal such as brass forward and rearward on its axis to a required angle by means of the handle lever 8 made of resin. The axis of the disk actuating stem 2 is inclined at a required angle relative to a vertical line to slide the movable disk (not shown) accommodated in the housing 3 on the fixed disk having two or more ports formed thereon. One end part of the handle lever 8 is formed in the shape of a cup. A fit-in hole 12 is formed on the inner side of the handle lever 8. A spacer 13, made of resin, having a disk portion 13a and a plate-shaped (rectangular solid) insertion portion 13b erected vertically on one surface of the disk portion 13a is installed on the handle lever 8 to seal a gap S1. The fit-in hole 12 is so formed on the handle lever 8 that the disk actuating stem 2 is loosely fitted therein, with the gap S1 (rectangular solid) formed between a side surface of the disk actuating stem 2 and an inner surface of the lever holder 9 defining a spacer insertion hole 14.

Figure 4:
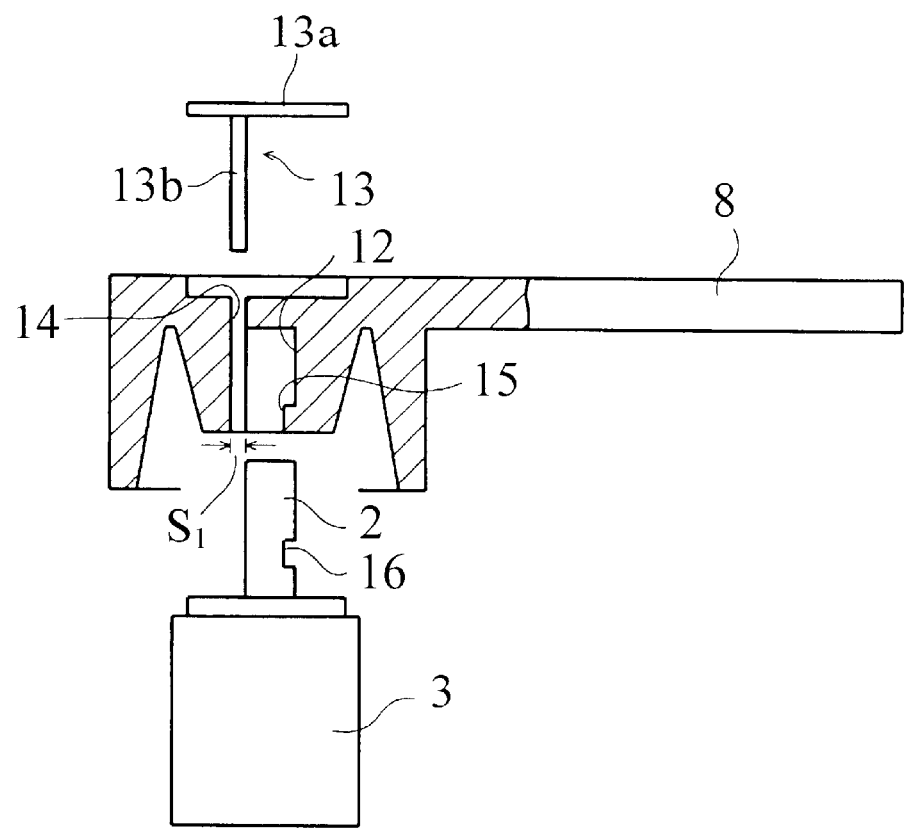
FIG. 4 is a front view partly in section showing the single lever mixing valve of embodiment 1, of which component parts are disassembled.
Figure 5:
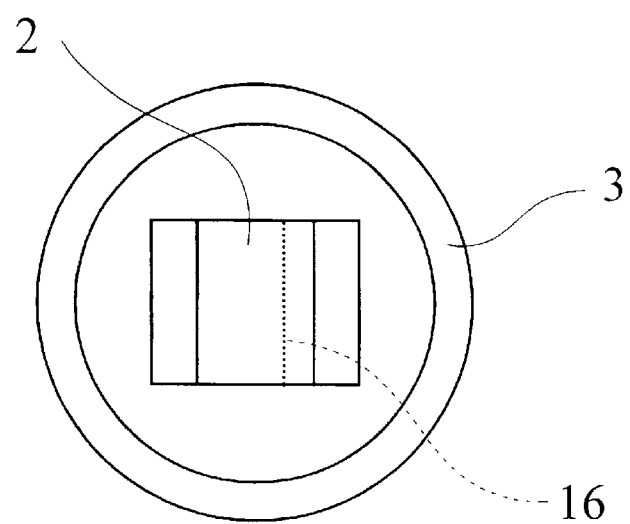
FIG. 5 shows an end surface of a disk actuating stem shown in FIG. 4.
Figure 6:
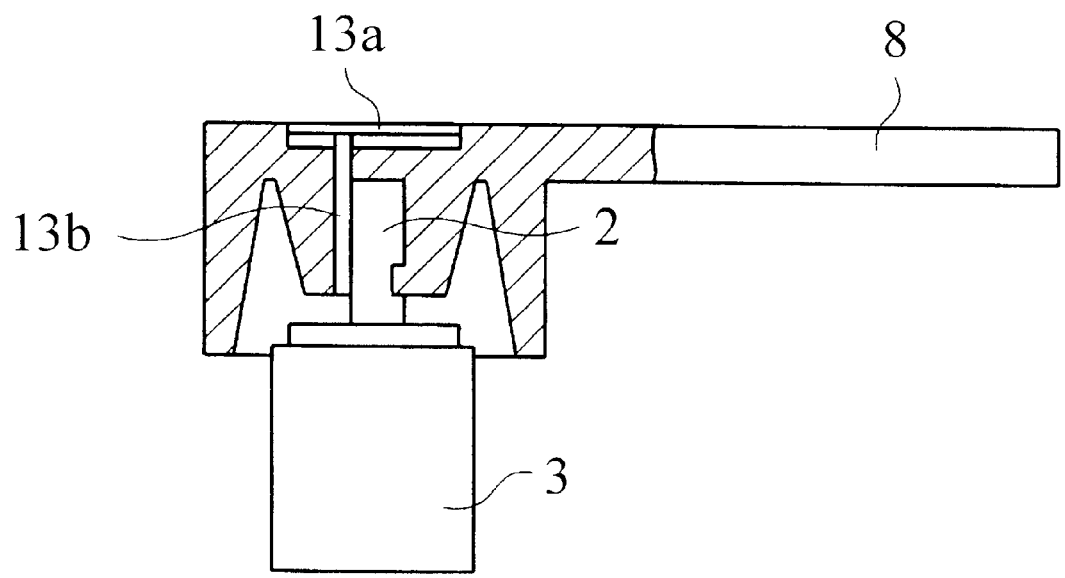
FIG. 6 is a front view partly in section showing the single lever mixing valve of the embodiment 1.

As shown in FIG. 4, a spacer insertion hole 14 is formed vertically in penetration through the handle lever 8 in the range from the gap S1 to the outer surface thereof. As shown in FIG. 6, when the plate-shaped insertion portion 13b of the spacer 13 is inserted into the spacer insertion hole 14, the insertion portion 13b is pressed against the side surface of the disk actuating stem 2. Consequently, the disk actuating stem 2 is fitted in the fit-in hole 12 with both being pressed against each other. As a result, the disk actuating stem 2 and the handle lever 8 are interlocked to each other.

By forming the spacer 13 of the same kind of resin as that of handle lever 8, the spacer 13 can be integrated with the handle lever 8, with the disk actuating stem 2 fitted in the fit-in hole 12 and pressed against each other. Thus, the single lever mixing valve can be operated without the handle lever 8 being loose with time. For example, it is preferable to form the handle lever 8, the disk portion 13a of the spacer 13, and its insertion portion 13b of the ABS resin. To facilitate an operation of installing the spacer 13 on the handle lever 8 and removing spacer 13 therefrom, it is preferable to form then disk portion 13a. However, the spacer 23 may have only the insertion portion 13b.

As shown in FIG. 4, in the embodiment 1, a stepped convex portion 15 having a uniform thickness is widthwise formed at a lower portion of one side surface of the approximately rectangular solid-shaped fit-in hole 12. A quadrilateral groove-shaped concave portion 16 is formed on one side surface of the disk actuating stem 2. The convex portion 15 is fitted in the groove-shaped concave portion 16 to prevent the disk actuating stem 2 from moving axially in the fit-in hole 12.

Figure 7:
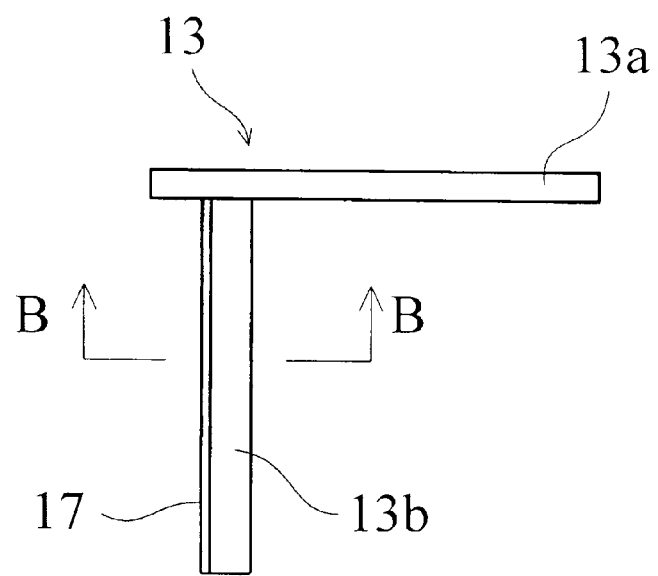
FIG. 7 is a front view showing a spacer of the single lever mixing valve of the embodiment 1.
Figure 8:
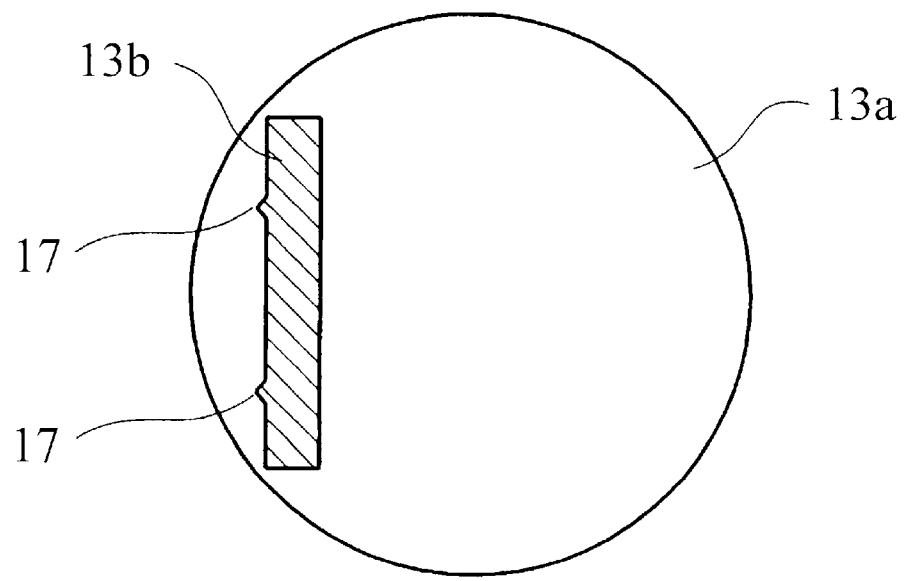
FIG. 8 is a sectional view, showing the spacer, taken along a line B—B of FIG. 7.
Figure 9:
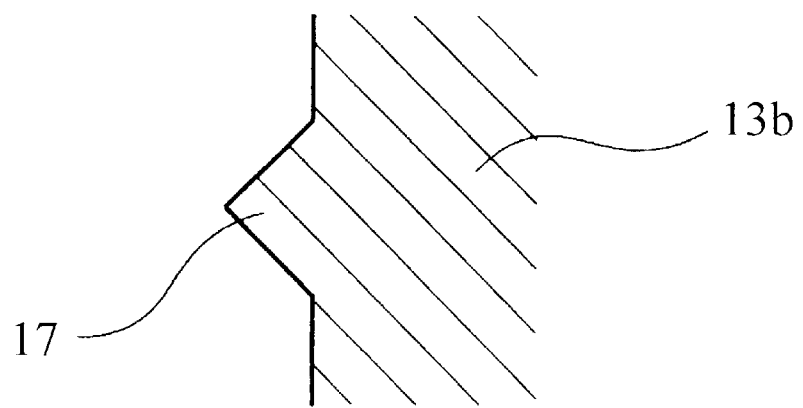
FIG. 9 is an enlarged sectional view showing main portions of the space of FIG. 8.

The spacer 13 shown in FIG. 4 has the rectangular solid-shaped insertion portion 13b having a smooth surface. Instead, as shown in FIGS. 7 through 9, a linear projection 17 or a projection having a known shape may be formed on the surface of the insertion portion 13b along the direction in which the spacer 13 is inserted into the spacer insertion hole 14. In this case, the insertion and removal of the spacer 13 can be accomplished smoothly.

Normally, a plurality of the linear projections 17 are formed to enhance its operability. The height of the linear projection 17 should be set to the range of 0.1 mm to 1.0 mm. The linear projection can be formed on a side surface of the spacer insertion hole 14. The linear projection formed on the spacer insertion hole 14 has the same operation as that of the linear projection formed on the insertion portion 13b.

The embodiment 2 is different from the embodiment 1 in the construction of the portion of handle lever 8 in which the disk actuating stem 2 is fitted. The other component parts of the embodiment 2 are identical to those of the component parts of the embodiment 1.

That is, in the handle lever 8 of the embodiment 2, a spacer insertion hole 14a is wedge-shaped such that the insertion hole 14a becomes gradually smaller toward its inner end along a gap S2. In correspondence to the shape of the insertion hole 14a, the gap S2 is wedge-shaped (directed reverse) such that the gap S2 becomes gradually larger toward its inner end.

In the single lever mixing valve of embodiment 2, the rectangular solid-shaped insertion portion 13b expands the narrow portion of the inside of the spacer insertion hole 14a. Consequently, the fit-in hole 12a so deforms that the gap S2 decreases. When the fit-in hole 12a has made a deformation to the maximum, the side surface of the fit-in hole 12a and that of the disk actuating stem 2 are pressed against each other, and a stepped convex portion 15a formed on the fit-in hole 12a is completely fitted in the concave portion 16 formed on the disk actuating stem 2, when the stepped convex portion 15a and the concave portion 16 are pressed against each other.

Figure 10:
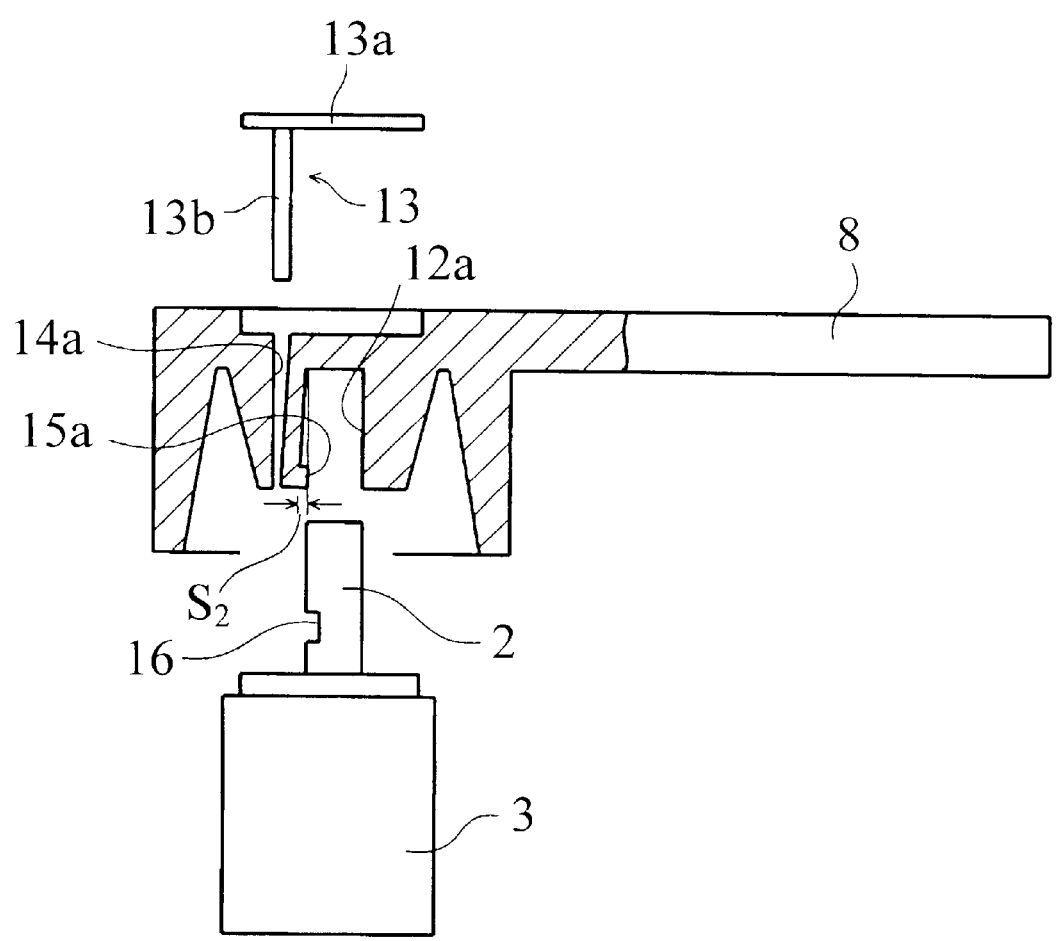
FIG. 10 is a front view partly in section showing the single lever mixing valve of embodiment 2, of which component parts are dissembled.
Figure 11:
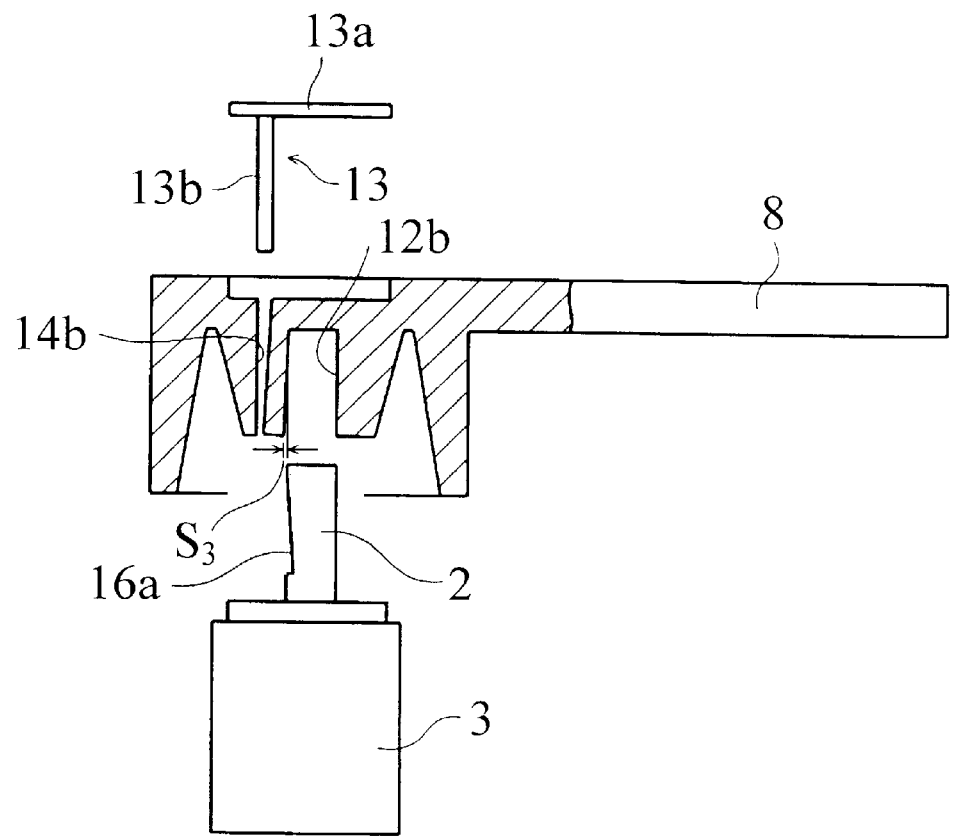
FIG. 11 is a front view partly in section showing the single lever mixing valve of embodiment 3, of which component parts are disassembled.
Figure 12:
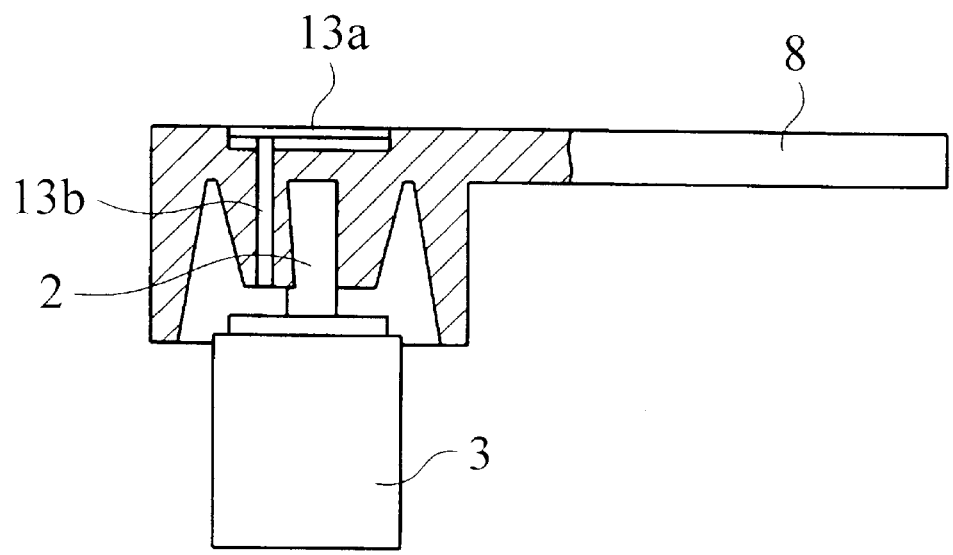
FIG. 12 is a front view partly in section showing the single lever mixing valve of embodiment 3.
Figure 13:
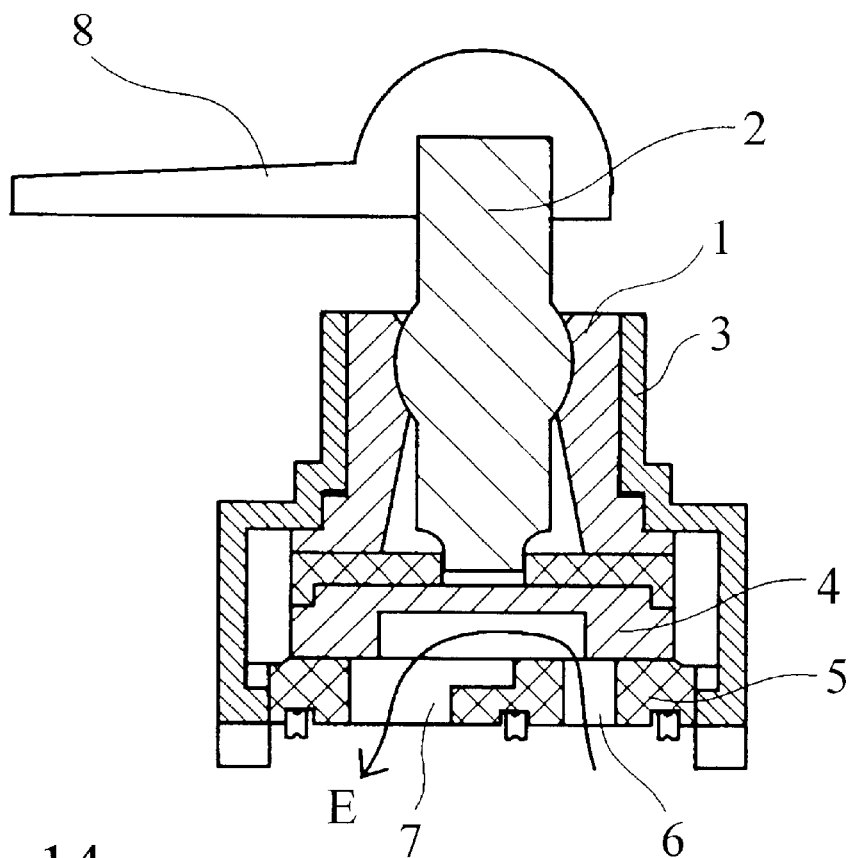
FIG. 13 is an explanatory view for explaining a cartridge of a single lever mixing valve.

In the third embodiment shown in FIGS. 11 and 12, the stepped convex portion is not formed on the side surface of the fit-in hole 12a (see FIG. 10) of the hand lever 8, unlike the embodiment 2; a wedge-shaped spacer insertion hole 14b is formed along the fit-in hole 12b formed in the handle lever 8, with the spacer insertion hole 14b located proximate to the fit-in hole 12b; a wedge-shaped cut-out 16a is formed on one side surface of the approximately rectangular solid-shaped disk actuating stem 2; the cut-out 16a is formed in the shape of an inverted quadrangular pyramid; and a gap S3 of the fit-in hole 12b is also wedge-shaped such that the gap S3 has almost the same size as that of the wedge-shaped cut-out 16a.

The single lever mixing valve of embodiment 3 assembled as shown in FIG. 12 does not have a moving portion between the disk actuating stem 2 and the fit-in hole 12b. Thus, the disk actuating stem 2 does not become loose with time and hence the handle lever can be operated securely.

EXAMPLE 8

In the example 8, the rectangular solid-shaped insertion portion of the spacer, shown in FIG. 4, having a flat surface was adopted. The handle lever and the spacer were made of ABS resin formed by injection molding. The disk actuating stem was made of brass formed by cutting work.

A durability test was conducted on the single lever mixing valve of example 8 to evaluate the operability of the handle lever. Table 2 shows the results.

The fixing state of the handle lever was checked every 50,000 cycles from 50,000 up to 200,000 cycles to examine its durability.

The durability of the handle lever was evaluated by vertically operating the handle lever, with an operator holding by hand to measure a moved angle (free play angle) of the handle lever with respect to the disk actuating stem when the handle lever moved without applying a force thereto. The durability test was conducted for the single lever mixing valve of example 8–10 and comparison examples 2–4, as shown in Table 2. A moved angle of the handle lever less than 2 degrees marked with 0, the moved angled thereof more than two degrees and less than five degrees was marked with Δ, the moved angle thereof not less than five degrees marked with x.

Using the single lever mixing valve of embodiment 2 shown in FIG. 10, a linear projection 17 (FIG. 9) triangular in section and having a height of 0.3 mm was formed on the surface of the spacer along the insertion direction of the spacer. Similarly to example 8, the handle lever and the spacer were made of ABS resin formed by injection molding. The disk actuating stem is made of brass formed by cutting work.

Similarly to example 8, a durability test was conducted on the single lever mixing valve of example 9 to evaluate the operability of the handle lever. Table 2 shows the results.

A single lever mixing valve was prepared in the same manner as that of example 9 except that the handle lever and the spacer were formed of polyacetal resin (POM) by injection molding. Similarly to example 9, a durability test was conducted on the single lever mixing valve of example 10 to evaluate the operability of the handle lever.

Comparison Example 2

Figure 14:
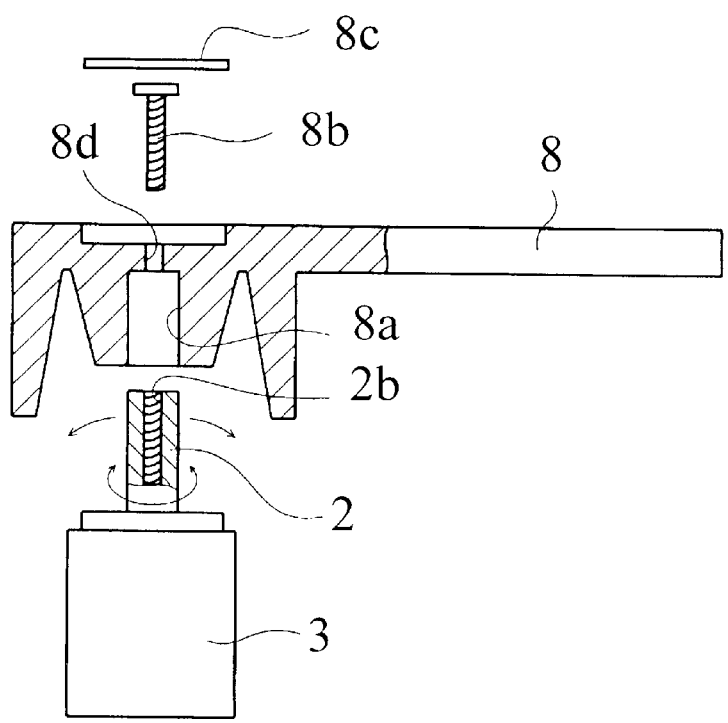
FIG. 14 is a front view partly in section showing a conventional single lever mixing valve, of which component parts are disassembled.
Figure 15:
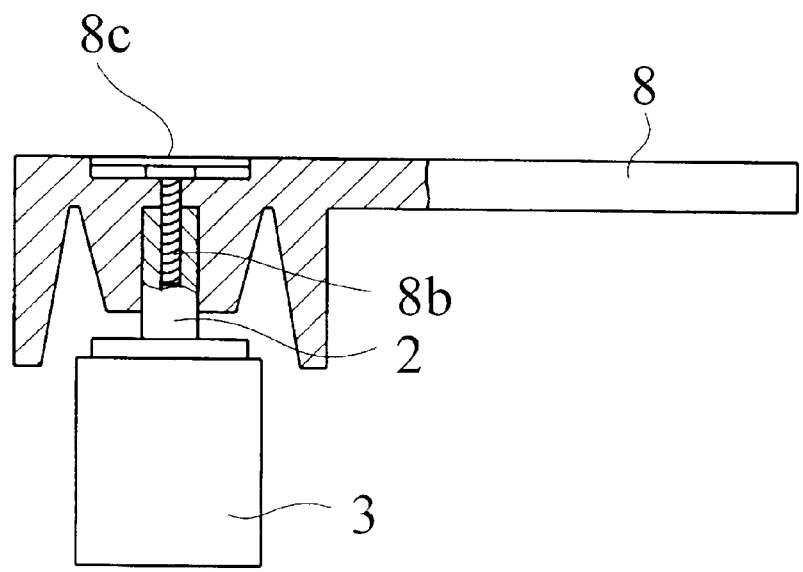
FIG. 15 is a front view partly in section showing a conventional single lever mixing valve.

Using the conventional single lever mixing valve shown in FIGS. 14 and 15, the disk actuating stem was fixed to the handle lever with the screw 8b without applying a loosening prevention agent to the screw 8b. The handle lever was made of ABS resin by injection molding. The disk actuating stem was made of brass formed by cutting work.

A durability test was conducted on the single lever mixing valve of comparison example 2 to evaluate the operability of the handle lever. Table 2 shows the results.

Using the conventional single lever mixing valve shown in FIGS. 14 and 15, the disk actuating stem was fixed to the handle lever with the screw 8b by applying the loosening prevention agent (produced in the name of Lock-tight by Nippon Lock-tight Inc.) to the screw 8b.

A durability test was conducted on the single lever mixing valve of comparison example 3 to evaluate the operability of the handle lever. Table 2 shows the results.

Figure 16:
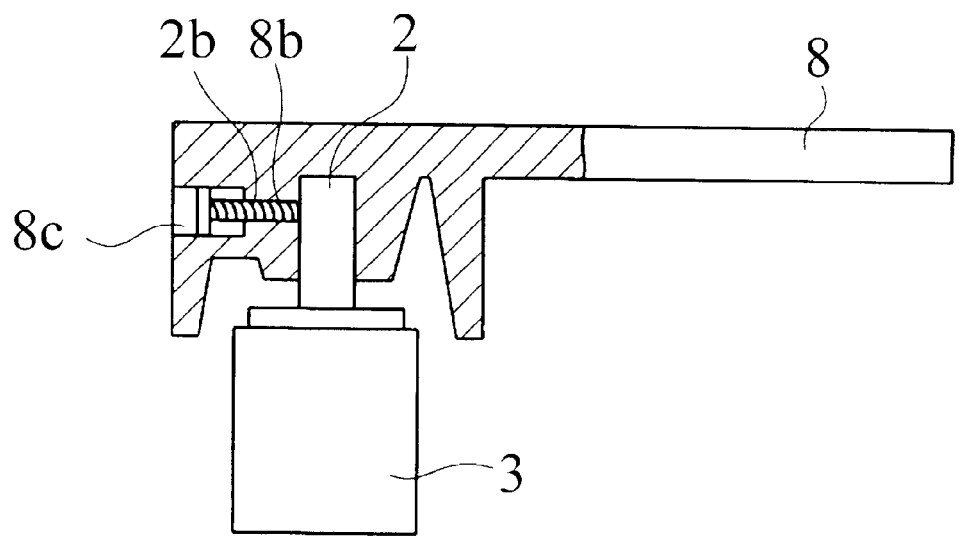
FIG. 16 is a front view partly in section showing another conventional single mixing valve, of which component parts are disassembled.

Using the conventional single lever mixing valve shown in FIG. 16, the disk actuating stem was fixed to the handle lever with the screw 8b by applying the loosening prevention agent (produced in the name of Lock-tight by Nippon Lock-tight Inc.) to the screw 8b.

A durability test was conducted on the single lever mixing valve of comparison example 4 to evaluate the operability of the handle lever. Table 2 shows the results.

TABLE 2

|  | Example | | | Comparison Example | | |
| --- | --- | --- | --- | --- | --- | --- |
|  | 8 | 9 | 10 | 2 | 3 | 4 |
| After 50,000 cycles | o | o | o | o | o | o |
| After 100,000 cycles | o | o | o | o | o | o |
| After 150,000 cycles | o | o | o | x | o | x |
| After 200,000 cycles | o | o | o | — | Δ | — |

As Table 2 indicates, the single lever mixing valve of each of the comparison examples 2–4 in which the handle lever was screwed to the disk actuating stem had a favorable result in the durability test up to 50,000 cycles but the handle lever was shaky in the 100,000 to 200,000 cycles.

On the other hand, in the single lever mixing valve of examples 8–10, the handle lever mixing valve was not loose in the durability test even after 200,000 cycles.

The durability test was conducted up to 250,000 cycles. In example 10 in which the handle lever and the spacer were made of different resins, the handle lever was shaky. The spacer of examples 9 and 10 having the linear projection formed on the surface thereof could be inserted into the spacer insertion hole and removed therefrom more smoothly than the spacer of example 8 not having the linear projection formed on the surface thereof. There was no difference in the operability of the handle lever between the single lever mixing valve of example 8 and the single lever mixing valve of examples 9 and 10.

According to the single lever mixing valve of the present invention, because the handle lever and the disk actuating stem have the above-described construction, the handle lever-fixing construction is simple and eliminates the need for the use of the loosening prevention agent. Further, the handle lever can be fixed to the disk actuating stem securely. Furthermore, the handle lever can be operated lightly and securely even though the single lever mixing valve is used for a long time.

The spacer insertion hole is formed in penetration through the handle lever in the range from the gap to the outer surface thereof. Further, the spacer insertion hole is wedge-shaped in the handle lever along the gap. Accordingly, it is possible to securely obtain the above-described advantages.

In the single lever mixing valve, the handle lever-installing operation can be simply accomplished and assembled without taking much time and labor. The single lever mixing valve allows the handle lever to be installed securely, has a uniform tolerance, prevents the handle lever from being loose or causing troubles even though the single lever mixing valve is used over as many as 200,000 cycles, and prevents the movable disk from being damaged easily.

The concave portion or the convex portion which fits in the concave portion is formed on the side surface of the disk actuating stem and the fit-in hole. Therefore, it is possible to prevent the slip-off of the handle lever.

The linear projection is formed on the surface of the spacer or the side surface of the spacer insertion hole along the direction in the spacer insertion direction. Thus, it is possible to smoothly perform the operation of inserting the spacer into the spacer insertion hole and replacing the spacer.

What is claimed is:

1. A single lever mixing valve comprising, a disk actuating stem for adjusting an amount and temperature of discharge water by inclining or rotating on an axis thereof, and a handle lever operating said stem, said handle lever is not fixed to the stem with a screw, wherein a fit-in-hole is so formed on said handle lever that said disk actuating stem is loosely fitted therein, with a gap formed between a side surface of said disk actuating stem and a gap-defining inner surface of said handle lever; a spacer so sized as to close said gap is provided; a spacer insertion hole is formed in said handle lever such that said spacer insertion hole is open on an outer surface of said handle lever; and said spacer is inserted into said spacer insertion hole to fix said disk actuating stem fitted in said spacer insertion hole.

2. A single lever mixing valve according to claim 1, wherein said spacer insertion hole is formed in penetration through said handle lever in the range from said gap to said outer surface of said handle lever.

3. A single lever mixing valve comprising, a disk actuating stem for adjusting an amount and temperature of discharge water by inclining or rotating on an axis thereof, and a handle lever operating said stem, wherein a fit-in-hole is so formed on said handle lever that said dish actuating stem is loosely fitted therein, with a gap formed between a side surface of said disk actuating stem and a gap defining inner surface of said handle lever; a spacer so sized as to close said gap is provided; a spacer insertion hole is formed in said handle lever such that said spacer insertion hole is open on an outer surface of said handle lever; and said spacer is inserted into said spacer insertion hole to fix said disk actuating stem in said spacer insertion hole, wherein said spacer insertion hole is wedge-shaped such that an insertion hole becomes gradually smaller toward an inner end along said gap.

4. A single lever mixing valve comprising, a disk actuating stem for adjusting an amount and temperature of discharge water by inclining or rotating on an axis thereof, and a handle lever operating said stem, wherein a fit-in-hole is so formed on said handle lever that said disk actuating stem is loosely fitted therein, with a gap formed between a side surface of said disk actuating stem and a gap-defining inner surface of said handle lever; a spacer so sized as to close said gap is provided; a spacer insertion hole is formed in said handle lever such that said spacer insertion hole is open on an outer surface of said handle lever; and said spacer is inserted into said spacer insertion hole, wherein a concave portion or a convex portion which fits in said concave portion is formed on a side surface of said fit-in-hole or said disk actuating stem to prevent said disk actuating stem from sliding axially.

* * * * *